United States Patent
Wood

(10) Patent No.: US 9,992,233 B2
(45) Date of Patent: Jun. 5, 2018

(54) ENHANCED FIREWALL AND METHOD FOR SECURING INTERNET COMMUNICATIONS

(71) Applicant: Michael C. Wood, Lazy Lake, FL (US)

(72) Inventor: Michael C. Wood, Lazy Lake, FL (US)

(*) Notice: Subject to any disclaimer, the term of this patent is extended or adjusted under 35 U.S.C. 154(b) by 0 days. days.

(21) Appl. No.: 15/452,481

(22) Filed: Mar. 7, 2017

(65) Prior Publication Data

US 2017/0264641 A1   Sep. 14, 2017

Related U.S. Application Data

(63) Continuation-in-part of application No. 15/206,594, filed on Jul. 11, 2016, and a continuation-in-part of application No. 15/178,123, filed on Jun. 9, 2016, now Pat. No. 9,742,734.

(60) Provisional application No. 62/308,205, filed on Mar. 14, 2016, provisional application No. 62/314,225, filed on Mar. 28, 2016, provisional application No.
(Continued)

(51) Int. Cl.
*H04L 29/06* (2006.01)
*H04L 29/08* (2006.01)
*H04L 29/12* (2006.01)
*H04L 12/721* (2013.01)

(52) U.S. Cl.
CPC .............. *H04L 63/20* (2013.01); *H04L 45/66* (2013.01); *H04L 61/1511* (2013.01); *H04L 61/2038* (2013.01); *H04L 61/2069* (2013.01); *H04L 61/6022* (2013.01); *H04L 63/0227* (2013.01); *H04L 63/0236* (2013.01); *H04L 63/0263* (2013.01); *H04L 63/101* (2013.01); *H04L 63/1408* (2013.01); *H04L 63/1433* (2013.01); *H04L 67/12* (2013.01)

(58) Field of Classification Search
CPC ...... H04L 63/20; H04L 63/0263; H04L 67/12
See application file for complete search history.

(56) References Cited

U.S. PATENT DOCUMENTS 7,523,186 B1 * 4/2009 Waters ............... G06F 15/173
709/203
9,397,978 B1   7/2016 Cha
(Continued)

OTHER PUBLICATIONS

Jan Dolezal, "Design of Smart Home Multi-Layer Control System", Czech Technical University in Prague, Retrieved From https://support.dce.felk.cvut.cz/mediawiki/images/d/db/Dp_2008_dolezal_jan.pdf, Published 2008 (Year: 2008).*
(Continued)

*Primary Examiner* — Chau Le
(74) *Attorney, Agent, or Firm* — Johnson & Martin, P.A.; James David Johnson

(57) ABSTRACT

A system and method are described for securing a network-connected device from a hacker having access to a network to which the network-connected device is communicatively connected. Such network-connected devices include a variety of electronics that when connected to the Internet are commonly referred to as the Internet of things ("IoT"). The systems and methods described herein include a transparent traffic control (TTC) device that is installed between an IoT device and a communications network to intercept data packets transmitted between the IoT device and the network and to allow or block the data packets based on rules for a group to which the IoT device or a remote destination are assigned.

14 Claims, 4 Drawing Sheets

Related U.S. Application Data

62/328,912, filed on Apr. 28, 2016, provisional application No. 62/333,755, filed on May 9, 2016, provisional application No. 62/348,518, filed on Jun. 10, 2016, provisional application No. 62/350,556, filed on Jun. 15, 2016, provisional application No. 62/354,588, filed on Jun. 24, 2016.

(56) References Cited

U.S. PATENT DOCUMENTS

| | | |
|---|---|---|
| 9,467,324 B2 | 10/2016 | Wood |
| 9,742,734 B2 | 8/2017 | Wood |
| 9,853,826 B2 * | 12/2017 | Shuman .............. H04L 12/2803 |
| 2006/0253901 A1 | 11/2006 | Roddy et al. |
| 2007/0016945 A1 | 1/2007 | Bassett |
| 2007/0033645 A1 | 2/2007 | Jones |
| 2009/0201851 A1 * | 8/2009 | Kruys ................... H04W 16/14 |
| | | 370/328 |
| 2011/0231890 A1 | 9/2011 | Tovar |
| 2012/0143355 A1 * | 6/2012 | Honma ............... H04L 12/2807 |
| | | 700/17 |
| 2012/0146918 A1 * | 6/2012 | Kreiner ............... H04M 1/7253 |
| | | 345/173 |
| 2012/0151364 A1 * | 6/2012 | Chueh .................... H04L 12/66 |
| | | 715/736 |
| 2014/0233484 A1 * | 8/2014 | Doetsch ............... H04J 11/0053 |
| | | 370/329 |
| 2014/0244834 A1 * | 8/2014 | Guedalia ................ H04L 67/16 |
| | | 709/224 |
| 2015/0326530 A1 | 11/2015 | Wood |
| 2015/0381776 A1 * | 12/2015 | Seed ...................... H04L 67/16 |
| | | 709/203 |

OTHER PUBLICATIONS

International Search Report dated May 26, 2017, in connection with Application Serial No. PCT/US17/21246 in the name of Michael C. Wood.

* cited by examiner

ENHANCED FIREWALL AND METHOD FOR SECURING INTERNET COMMUNICATIONS

CROSS REFERENCE TO RELATED APPLICATIONS

This application is a nonprovisional application of and claims priority from U.S. Provisional Application Ser. No. 62/308,205 filed on Mar. 14, 2016; U.S. Provisional Application Ser. No. 62/314,225 filed on Mar. 28, 2016; U.S. Provisional Application Ser. No. 62/328,912 filed on Apr. 28, 2016; U.S. Application Ser. No. 62/333,755 filed on May 9, 2016; U.S. Continuation-in-Part Nonprovisional application Ser. No. 15/206,594 filed on Jul. 11, 2016; U.S. Continuation Nonprovisional application Ser. No. 15/178,123 filed on Jun. 9, 2016; U.S. Provisional Application Ser. No. 62/348,518 filed on Jun. 10, 2016; U.S. Provisional Application Ser. No. 62/350,556 filed on Jun. 15, 2016, and U.S. Provisional Application Ser. No. 62/354,588 filed on Jun. 24, 2016. U.S. Provisional Application Ser. No. 62/192,365 filed on Jul. 14, 2015; U.S. Provisional Application Ser. No. 62/295,315 filed on Feb. 15, 2016; and U.S. Nonprovisional application Ser. No. 14/706,459 filed on May 7, 2015, now U.S. Pat. No. 9,467,324, are incorporated in their entireties herein by reference.

FIELD OF THE INVENTION

The invention relates to systems and methods for securing Internet-connected devices. More particularly, the invention relates to systems, methods, and associated software for securing Internet-connected devices from hacking and other online security threats.

BACKGROUND

A rapidly growing trend is underway to incorporate Internet connectivity within all home electronics. In fact, Internet connectivity is already available for a plethora of "Internet of Thing" ("IoT") devices including, but not limited to, televisions, printers, home security cameras, motion detectors, home alarm systems, thermostats, light bulbs, and even appliances (not to mention home computers, tablets, and smart phones). The cybersecurity industry has not successfully developed a highly secure yet easy-to-use security methodology for individual computers. Now, with an innumerable number of other electronic devices coming online, the security issues appear to become exponentially more complex with each new device that is added. However, such exponential complexity only applies to prior security methodologies.

Some smart televisions contain built-in cameras and microphones. Hackers have been able to use these components to spy on people, watching or recording everything they do in front of the television and listening to or recording everything they say. Criminals have hacked into home motion detectors to determine living patterns. They have used this information to determine when homes are usually empty and then to plan their burglaries using this information. Criminals can also hack alarm systems, temporarily shutting them down and even altering their logs to conceal the temporary shutdown. Such methods allow burglars to enter, burglarize, and exit—all without a trace.

Unfortunately, getting products to market has been a much higher priority than providing robust security. The security of Internet-based electronics is often an afterthought—including the Internet security of security products themselves (e.g., alarm systems, security cameras, etc.). Moreover, should manufacturers begin to take security more seriously, each product would then have its own unique security mechanism which would add a significant burden to the consumer both from the perspective of learning to operate the device and its security functions as well as due to the added cost of incorporating such security measures, which manufacturers invariably would pass on to consumers.

A need exists for securing Internet-enabled devices in the developing and rapidly expanding Internet of Things while maintaining the ease of use and configuration of such devices for those who use them.

SUMMARY

The systems and security methodology disclosed herein protect IoT devices from remote, Internet-based hackers. Protection against hackers physically nearby requires only two actions by manufacturers. First, such protection requires that all Internet configuration be performed via hardwires (e.g., Ethernet cable, USB port, etc.) so that hackers geographically near to a wireless network cannot gain control over a connected device's configuration using a wireless connection. Second, such protection against nearby hackers requires that the continued operation of the device be either hardwired or use standards-based wireless security (such as WPA2) so that hackers who are geographically close to the wireless network cannot execute wireless man-in-the-middle attacks. Many home devices already meet these two requirements, and therefore, can use the disclosed methodology and systems in a plug-and-play manner to protect against remote, Internet-based hackers. The systems and methods disclosed herein provide protection against remote Internet-based hackers regardless of whether or not the manufacturer provides the requisite protection against local hackers; no modification to the hardware needs to be made whatsoever.

As documented herein, the new and novel security systems and methods can be easily extended to an unlimited number of Internet-connected electronic devices while fully preserving both ease-of-use and maximum security at the same time.

This system and method empower a user to easily provide maximum security to an entire location's set of IoT devices. Thus, the oft-taught presumption that ease-of-use is inversely proportionate to security level has been overcome even for this previously exponentially complicated issue.

Accordingly, the invention features a system for securing a network-connected device from a hacker having access to a network to which the network-connected device is communicatively connected. The system includes at least one network-connected device ("IoT Device") communicatively connected to a communications network and a transparent traffic control device ("TTC Device") for intercepting a data packet transmitted via the communications network to and from the at least one IoT Device and at least one remote destination. The TTC Device includes an IoT device identification process for detecting each at least one IoT Device that connects to the communications network and for assigning each newly detected at least IoT device to a group selected from among at least one group. Each at least one group includes a group identity. The TTC Device also includes a status selection process for assigning the status of each at least one group, wherein the status is allowed or blocked, and a group data structure that includes a name of each at least one IoT Device detected by the IoT device identification process and the group identity of the at least one group to which each at least one IoT Device is assigned. The TTC Device further includes a firewall that allows or blocks transmission of the data packet based on the status of the group that the IoT Device, to or from which the data packet is transmitted, is assigned. The system also includes a control interface for displaying the group identity and the status of the group identity.

In another aspect, the invention can feature a packet received by the firewall from a remote destination having an allowed status being permitted by the firewall to be transmitted to the IoT device, and a packet received by the firewall from a remote destination having a blocked status being discarded.

In another aspect, the invention can feature the IoT Device being a television, a printer, a home security camera, a motion detector, a home alarm system, a thermostat, a light bulb, an automobile, a gaming console, a handheld gaming device, a DVD player, a radio, a stereo, a portable music playing device, a speaker, an appliance, a computer, a tablet computer, or a smart phone.

In another aspect, the invention can feature the TTC Device including a computing device, a router, or a separate and unitary standalone device.

In another aspect, the invention can feature the control interface being part of or being directly connected to the TTC device.

In another aspect, the invention can feature the control interface being part of or being directly connected to a computing device that is not the TTC device.

In another aspect, the invention can feature the IoT Device including the TTC Device as an integral component of the IoT Device.

In another aspect, the invention can feature the status for the at least one group being changeable using the status selection process.

In another aspect, the invention can feature the group being identified on the interface by the group name, a color, a symbol, an image, or a combination of one or more of the foregoing.

In another aspect, the invention can feature the at least one remote destination being a domain name, a subdomain, an IP address, or other remote destination.

In another aspect, the invention can feature the TTC Device further including a pairing process for identifying and assigning a status to a remote destination/IoT Device pair, wherein the remote destination/IoT Device pair is identified when the IoT device attempts to communicate with the at least one remote destination or when the at least one remote destination attempts to communicate with the IoT Device, and wherein the status of the remote destination/IoT Device pair is allowed or blocked.

The invention also features a system for securing a network-connected device from a hacker having access to a network to which the network-connected device is communicatively connected. The system includes a transparent traffic control device ("TTC Device") for intercepting data packets transmitted via the communications network to and from at least one network-connected device ("IoT Device") communicatively connected to a communications network. The TTC Device includes an IoT device identification process for detecting each new at least one IoT Device that connects to the communications network. The TTC Device further includes a firewall for allowing or blocking transmission of the data packets transmitted to and from each at least one IoT Device detected by the IoT device identification process based on a group to which each at least one IoT Device is assigned and a status assigned to that group.

In another aspect, the invention can feature the firewall having an allow-all mode and a block-all mode that may be selected to affect data packets intercepted by the TTC Device.

In another aspect, the invention can feature all data packets sent to or from an IoT Device being blocked until a status of the group, to which the at least one IoT Device is assigned, is changed from blocked to allowed.

In another aspect, the invention can feature the TTC Device further including a pairing process for identifying and assigning a status to a remote destination/IoT Device pair, wherein the remote destination/IoT Device pair is identified when the IoT device attempts to communicate with the at least one remote destination or when the at least one remote destination attempts to communicate with the IoT Device, and wherein the status of the remote destination/IoT Device pair is allowed or blocked.

A method of the invention can be used for securing a network-connected device from a hacker having access to a network to which the network-connected device is communicatively connected. The method includes the steps of: (a) installing a transparent traffic control device ("TTC Device") between at least one network-connected device ("IoT Device") and communications network to which the IoT Device is communicatively connected; (b) using the TTC device, intercepting a data packet transmitted to or from the IoT Device; (c) using an IoT device identification process operable on the TTC Device, detecting each new at least one IoT Device that connects to the communications network; (d) displaying an identity of the IoT Device on a control interface; (e) assigning each newly detected at least one IoT device to a group selected from among at least one group, wherein each at least one group has a group identity; (f) assigning the status of each at least one group, wherein the status is allowed or blocked; (g) storing the identity of each at least one IoT Device detected by the IoT device identification process and the group identity of the at least one group to which each at least one IoT Device is assigned in a group data structure; and (h) using a firewall, allowing or blocking transmission of the data packet based on the status of the group that the IoT Device, to or from which the data packet is transmitted, is assigned.

Another method of the invention can include the step of (i) using a pairing process operable on the TTC Device, identifying and assigning a status to a remote destination/IoT Device pair, wherein the remote destination/IoT Device pair is identified when the IoT device attempts to communicate with the at least one remote destination or when the at least one remote destination attempts to communicate with the IoT Device, and wherein the status of the remote destination/IoT Device pair is allowed or blocked.

Another method of the invention can include a step selected from among: (j) allowing all data packets to or from each newly detected at least one IoT Device until the status is changed to blocked; or (k) blocking all data packets to or from each newly detected at least one IoT Device until the status is changed to allowed.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
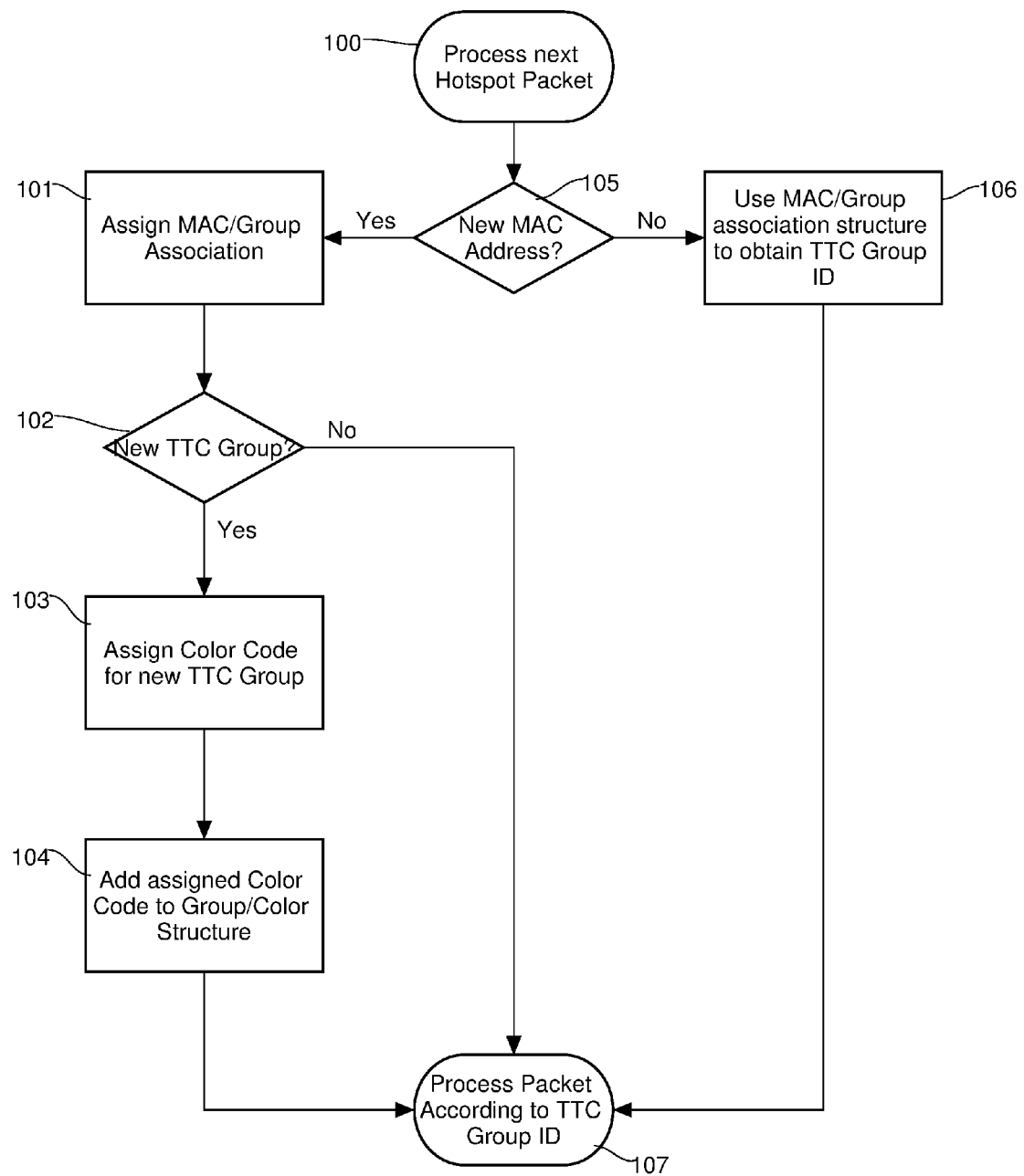
FIG. 1 is a flow chart diagram of a process of the method, device, and software in which data packets enter a TTC Device.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides transparent traffic control ("TTC") devices, systems, and methods for securing Internet-connected devices (the latter also referred to herein as IoT devices) from hackers and other online security threats. As mentioned elsewhere herein, the device is sometimes referred to herein as a TTC Device. IoT devices can include, without limitation, televisions, printers, home security cameras, motion detectors, home alarm systems, thermostats, light bulbs, gaming consoles, handheld gaming devices, DVD players, radios, stereos, portable music playing devices (e.g., an mp3 player), speakers (including wired, wireless, and portable speakers), and appliances. The TTC devices and methods can also be used to secure more traditional Internet-connected devices including home computers, tablet computers, and smart phones.

As previously stated, the systems and methods described in the applications and issued patents incorporated by reference herein secure individual electronics via the Internet IP Address layer. Now, this present disclosure extends that same security to a location's entire set of IoT devices by incorporating the Physical MAC address layer. For simplicity, this extended security methodology and system is referred to herein as the transparent traffic control hotspot ("TTC Device"), which incorporates hardware and software used to implement the methods of this invention.

Traditionally, wireless Internet-based devices are configured to use the SSID and Password of the Internet Router. From a user's perspective, not much has changed. Using the present systems and methods, the user simply configures each device with the SSID and Password of the TTC Device (which can be a standalone device, or integrated into a networked PC, or integrated into the Internet Router itself, etc.) instead of configuring the IoT device to communicate directly with the Internet Router. In one embodiment, whenever a new MAC address is detected, the TTC Device presents the user with the option to assign the new device to a transparent traffic control group ("TTC Group"). For example, the user may want to assign all motion detectors to a TTC Group entitled "Motion Detectors"; the user may want to assign all smart televisions to a TTC Group entitled "Televisions"; and the user may want to assign all personal computers, tablet computers, and phones to a TTC Group entitled "Browsers." Wired IoT devices can be configured by assigning the TTC Device as the default gateway instead of assigning the Internet router as the default gateway.

Internet-based electronics have (at minimum) two numeric addresses: a Physical MAC Address and an Internet IP Address. U.S. Pat. No. 9,467,324 ("the '324 patent," which previously issued from U.S. Nonprovisional patent application Ser. No. 14/706,459) and the other patent applications incorporated by reference herein describe a methodologies and devices that restrict communication based on Internet IP Addresses. The systems and methods of the '324 patent also perform internal security checks on the packets to help prevent hackers from impersonating allowed IP Addresses. (Hackers often use "man-in-the-middle" attacks to impersonate well-known websites. For example, when a hacker impersonates Apple.com, the user's computer is tricked into determining that it is communicating directly with Apple, while instead, it is actually communicating with the hacker. The previous disclosure of the '324 patent includes a security procedure designed to thwart such impersonation.)

The TTC Device tracks the Remote Destination Name/Status associations on a per TTC Group basis, which can be accomplished in a variety of ways. For example, when displaying the status of a Traffic Requester, one embodiment uses a different background color for each TTC Group (e.g., "Motion Detectors" might be light blue, "Televisions" might be medium blue, and "Browsers" might be dark blue). The colors described herein are for purposes of showing examples; any other colors can be used in other embodiments. Alternatively, a separate window can be used for each group. Alternatively, the name of the group can appear along with the Traffic Requester status. Alternatively, an alias or some other symbolic representation of the TTC Group can be expressed along with the status. For ease of understanding, and not by way of limitation, the chosen embodiment may present the groups using different background colors. In this embodiment, all status changes made to "Light Blue" will only apply to all devices in the "Light Blue" group (e.g., the TTC Group, "Motion Detectors"). The same principle applies to the other color-coded groups as well. In other embodiments, other colors may be used, or rather than or in addition to colors, symbols, names, or both can be used to identify TTC Groups.

Display of the status of the Traffic Requester and other data related to methods herein requiring visual display and confirmation may be accomplished using a control interface that is accessible through a third party browser software application or other proprietary software application viewable via a computer monitor or other display screen communicatively connected to a computing device that, in turn, is connected to the TTC Device either directly via hardwire or via wireless communications means. The computing device can be a personal computer, a tablet computer, a smart phone, or any other suitable computing device capable of installing and executing third party browser software or proprietary software for viewing data displayed in the control interface. In another embodiment, the TTC Device can include its own built-in display screen for displaying such data. In still another embodiment, the TTC Device can have a separate display screen that is directly communicatively connectable to the TTC Device (without connection to a separate computing device) for displaying such data.

For simplicity, the following examples will discuss the highest-level of security (block-all mode). However, all the other security modes are equally applicable.

If the wireless motion detectors are from Nest Labs, Inc., the following will occur in the block-all mode. The user configures each motion detector with the SSID and Password of the TTC Device. During this installation, the TTC Device will recognize each new MAC Address and the user is then provided the means to assign each new device to a TTC Group. For each of the Motion Detectors the user (in this limited example) chooses "Motion Detectors." The user also (in this limited example) chooses Light Blue as this TTC Group's color code. From this point forward, the status of all Traffic Requests from the motion detectors will appear with a light blue background. For example, in block-all mode, the first Traffic Request to Nest.com might appear as follows: "Nest.com" (the Domain Name representation of the Remote Destination Name) appears in black letters (the color-coded representation of the status) on a light blue background (the color-coded representation of the TTC Group). Alternatives exist for representing the Remote Destination Name in addition to or in lieu of using the Domain Name. Such alternatives include, but are not limited to, using the domain owner's name ("Nest Labs"), a derivative of the domain owner's name, a derivative of the Domain Name, an alias representing the domain owner's name, and/or an alias representing the Domain Name. Various methods of communicating the Remote Destination Name are disclosed in U.S. Nonprovisional patent application Ser. No. 15/429,073, which is incorporated herein by this reference. Alternatives also exist for representing the traffic requester's TTC Group in addition to or in lieu of color-coding. Such alternatives include, without limitation, using the name of the group, a derivative of the group identity, an alias to represent the group identity, and/or one or more symbols to represent the group (e.g., an image of a camera could represent a "Cameras" TTC Group, etc.). Alternatives also exist for representing the current status in addition to or in lieu of color-coding. Such alternatives include representing the status via symbols (e.g., a lock symbol could represent a "blocked" status while a globe symbol represents an "allowed" status) and/or representing the status via words. For example, in the same scenario, the name "Nest Labs" could be used to signify the Remote Destination Name, underneath which appears a lock symbol (to signify a "blocked" status) next to the name "Motion Detectors." This combination of symbols and words would signify that Motion Detectors currently wants to talk to Nest Labs but is currently being blocked from doing so.

In a one-click implementation, the user can then allow traffic to Nest.com by clicking on the Nest.com name. In this example, the black letters may turn green to indicate that the Remote Destination Name/Status association has been changed to "Allow" for all members of the Light Blue group (i.e., the "Motion Detectors" TTC Group in this example). At this point, all motion detectors can now communicate with Nest.com and Nest.com can now communicate with them. Also, the motion detectors cannot communicate with anyone other than Nest.com, and no one other than Nest.com can communicate with the motion detectors. Furthermore, due to the internal security checks, high security is automatically provided against a cybercriminal impersonating Nest.com. With a single click of the mouse, all motion detectors are securely communicating with Nest.com and Nest.com only. In the alternative example above, a single click on "Motion Detectors" would change the lock symbol to the globe symbol signifying that the "Motion Detectors" TTC Group can communicate with Nest Labs.

In one embodiment, all other groups proceed in the same manner. Likewise, in this embodiment, separate Remote Destination Name/Status relations are maintained per TTC Group identity. For example, in a one-click, color-coded, block-all implementation, the user might click on Netflix.com, Vudu.com, and Pandora.com for the "Television" group (instantly enabling the smart televisions to access Internet-based movies and radio). At this point, all smart televisions can securely communicate with all three of these sites and all three of these sites only. Once again, protection is already provided against cybercriminals from impersonating any of these three sites. With each click of the mouse, secure access to any given site is instantly provided for the entire group.

It should be noted that one embodiment aggregates the entire group's communication to single lines when multiple devices within the group are communicating with the same Remote Destination Name. For example, a home may have 10 security cameras, 6 thermostats, 6 fire detectors, and 3 motion detectors all from Nest.com. In this example, the user is using a one-click, color-coded, block-all embodiment in which all of these devices have been assigned to a TTC Group entitled "Home Security" and assigned the color code "Light Blue." In this example, all 25 devices are communicating with Nest.com all at the same time. In this particular example, the status of all 25 devices can be shown with a single entry: Nest.com appears in green letters against a light blue background. (In the embodiment described in this example, the green letters can indicate that the Traffic Request for Nest.com was allowed and the light blue background can indicate that the Traffic Request came from one or more devices in the "Home Security" TTC Group). Even though all 25 devices may each be exchanging thousands of data packets with Nest.com, the aforementioned single line entry expresses it all. For such embodiments aggregating an entire TTC Group's communication to single lines, the same alternatives exist (as described above) for representing Group Names, Remote Destination Name, and Status.

Figure 2:
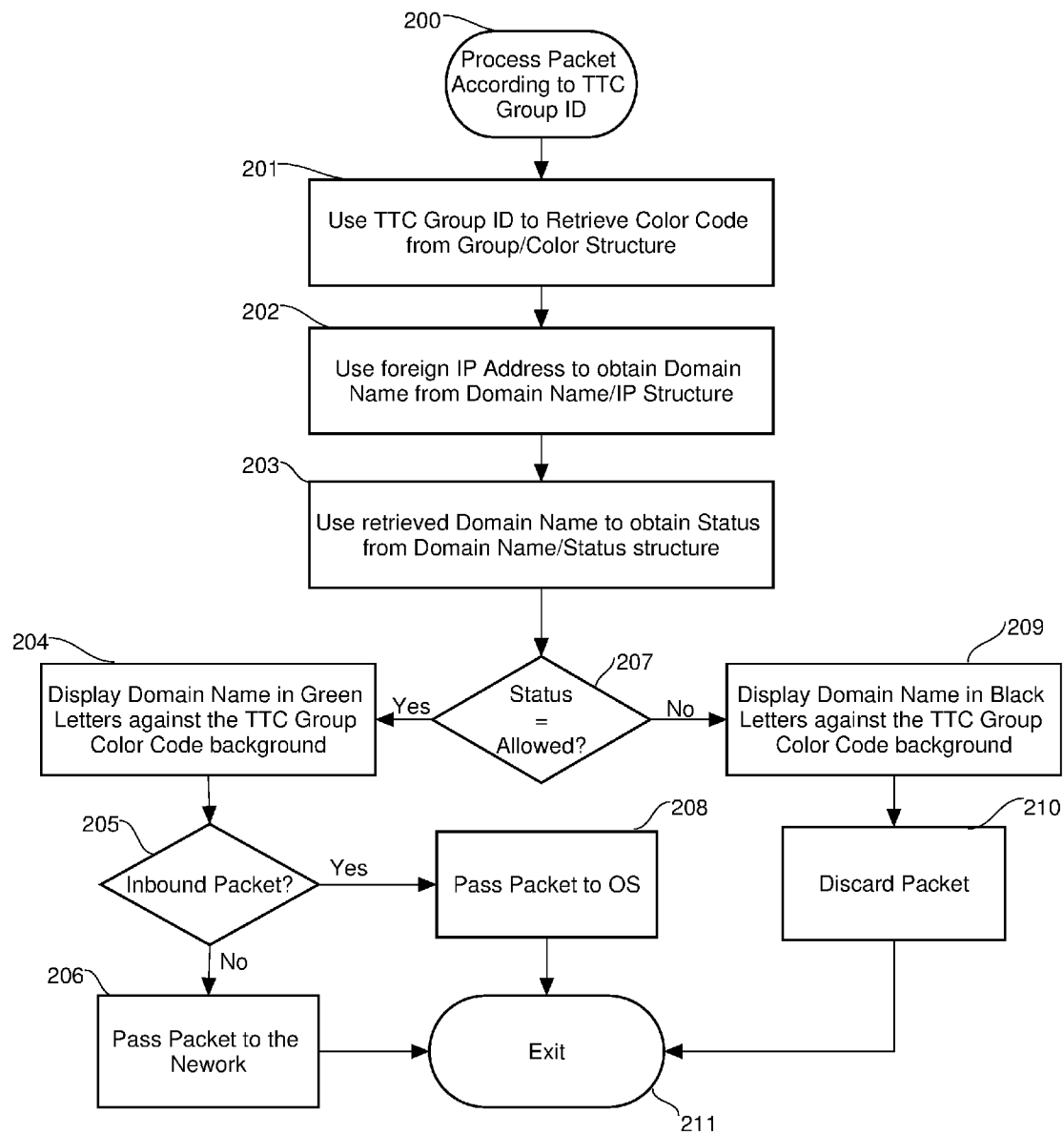
FIG. 2 is a continuation of the flow chart diagram of FIG. 1 that shows how data packets are processed according to a TTC Group ID.
Figure 3:
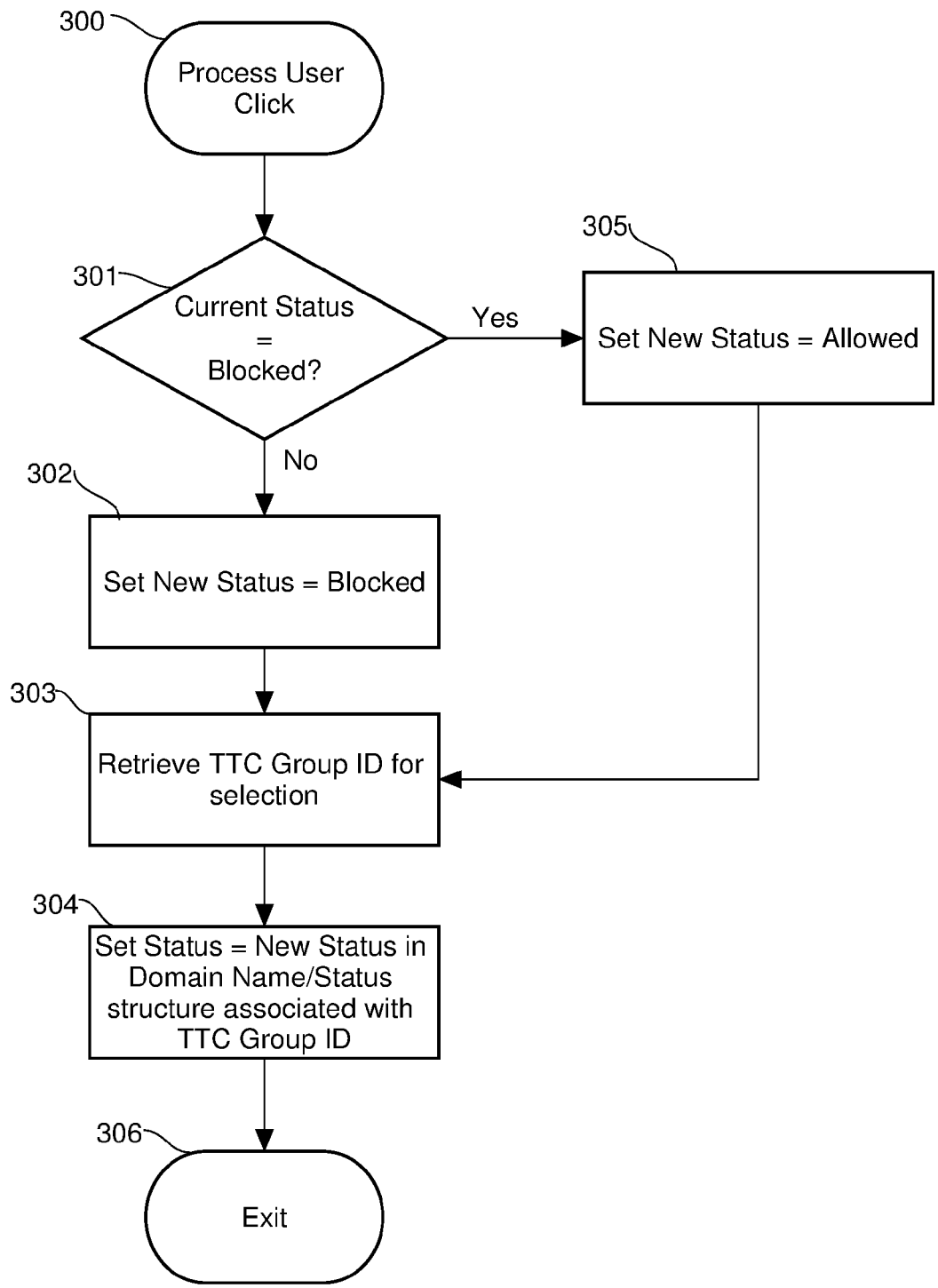
FIG. 3 is a flow chart diagram of another process of the method, device, and software in which a user's mouse clicks are processed by the TTC Device.

FIGS. 1-3 of the drawings illustrate one embodiment for securing IoT devices. The drawings illustrate one implementation of a block-all, color-coded, one-click embodiment. In this particular embodiment, there are two sources of input: packets entering the TTC Device and user mouse clicks. FIGS. 1-2 illustrate this embodiment's processing of data packets (also referred to herein simply as "packet" in the singular and "packets" in the plural) entering the TTC Device. FIG. 3 illustrates this embodiment's processing of user mouse clicks.

Once a new packet is received 100, the TTC Device, implementing the methods described herein using software and hardware, checks to see if the packet came from a new MAC Address 105. If not 105, then the TTC Device obtains the TTC Group ID from the MAC Address via the MAC/Group data structure 106. Alternative data structures can include, without limitation, tables, arrays, binary trees, red-black trees, linked lists, etc. (as are all well known in the current art). Once the Group ID is retrieved 106, the TTC Device then processes the packet in accordance with the retrieved Group ID 107.

If the packet does come from a new MAC Address 105 then this embodiment prompts the user to assign the new MAC address to a TTC Group 101. If the user chooses an existing TTC Group 102, then the embodiment processes the packet according to the already existing TTC Group ID 107. However, if a new TTC Group ID has been chosen 102, then the user is prompted to select a Color Code for the new TTC Group 103. Alternatively, a symbol, an alias name, and/or a derivative of the Group Name can be assigned to the new TTC Group 103, or this step can be skipped altogether (for example, in embodiments where the Group Name itself will be used in lieu of color-coding and symbols). In this particular embodiment, the newly chosen Color Code along with the new TTC Group ID are inserted into the Group/Color Code structure 104. The TTC Device then processes the packet in accordance with rules configured for the newly designated TTC Group ID 107.

FIG. 2 illustrates how this particular embodiment processes packets in accordance with their respective TTC Group IDs 200. The TTC Group ID is used to retrieve the Color Code from the Group/Color Code structure 201. The packet's foreign IP address is used to obtain the Domain Name from the Domain Name/IP structure 202. (Note that creation and maintenance of the Domain Name/IP structure is fully described as set forth in U.S. Nonprovisional patent application Ser. No. 14/706,459 ("the '459 application"), which is hereby incorporated herein in its entirety by this reference. The '459 application describes a series of security checks to validate that each IP Address in the Domain Name/IP structure truly belongs to the named website. In other words, the devices and methods of the '459 application protect against hackers' IP Addresses masquerading as the named websites instead.) The retrieved Domain Name is then used to obtain the Status from the Domain Name/Status structure 203. (Note that the creation and maintenance of Domain Name/Status structures is fully described in the '459 application.) The name of the owner of the domain could be used in lieu of or in addition to the Domain Name.

If the Status does not equal "Allowed" 207 then the Domain Name is displayed in black letters against a background matching the color of the Color Code 209. The packet is then discarded 210 and the process regarding this particular packet exits 211. However, if the Status does equal "Allowed" 207, then the Domain Name is displayed in green letters against a background matching the color of the Color Code 204. Then, the TTC Device performs a check to determine if the packet is an inbound packet 205. If the packet is an inbound packet 205, then it is forwarded to the Operating System; otherwise 205, the packet is forwarded to the network 206. Then, the process regarding this particular packet exits 211.

FIG. 3 illustrates how this particular embodiment of the TTC Device processes user clicks 300 (such as, for example, a click of a mouse, the pressing of a touch screen, etc.). This embodiment of the TTC Device checks to determine if the status is currently set to "Blocked" 301. If the status is currently set to "Blocked" 301, then the TTC Device sets New Status equal to "Allowed" 305; otherwise, the embodiment sets New Status equal to "Blocked" 302. In either case, the TTC Device then retrieves the TTC Group ID for the Domain Name selected by the user click 303. Then, the embodiment updates the Domain Name/Status structure associated with the retrieved TTC Group ID (such that the Status associated with the selected Domain Name equals New Status) 304. The user click process then exits 306.

As previously discussed in the '324 patent, which is incorporated herein in its entirety by this reference, the most secure paradigm is Deny-All Mode. While that disclosure includes an extremely convenient method for implementing Deny-All protection, some users will prefer to do absolutely nothing at all until they recognize a malicious entity. Typically, such users would operate in a Permit-All Mode until they see a malicious entity, and then they would block it.

As explained in U.S. Provisional Patent Application Ser. Nos. 62/192,365 and 62/295,315 (both to Wood and filed on Jul. 14, 2015 and Feb. 15, 2016, respectively), which are incorporated herein in their entirety by this reference, the systems and methods described herein include significant enhancements over the traditional Permit-All Mode. Given that the '324 patent already includes keeping track of domain names relative to IP Addresses, that system can optionally be set to a novel paradigm entitled Permit-Domains Mode.

A DNS system keeps track of organizations at a subdomain level. For example, Apple currently uses (among others) the following subdomains: www.apple.com, images.apple.com, and metrics.apple.com. A separate DNS name request is made to retrieve the IP addresses for each subdomain.

While the DNS system views organizations from a subdomain perspective, most users are only familiar with the organization itself. Therefore, to make network traffic controlling much simpler for users, the systems and methods described herein allow users to make changes based on the Domain Names (e.g., apple.com) and/or organization names (e.g., "Apple Inc.") rather than having to specify changes relative to the subdomains (i.e., subdomain-level changes).

In such methods, only the organization name and/or Domain Name would be displayed, and any state changes made to the organization name and/or Domain Name would be applied (internally) to all subdomains associated with that organization and/or the specified Domain Name.

For example, if a status change was applied to Apple Inc., then all of the subdomains belonging to all Apple Inc. —owned domains (e.g., itunes.com and apple.com) would inherit the status change.

As another example, if a status change was applied to the Domain Name Apple.com, then the status change would be immediately applied to all of the IP addresses of all of Apple.com's subdomains (e.g., www.apple.com, images.apple.com, and metrics.apple.com).

Figure 4:
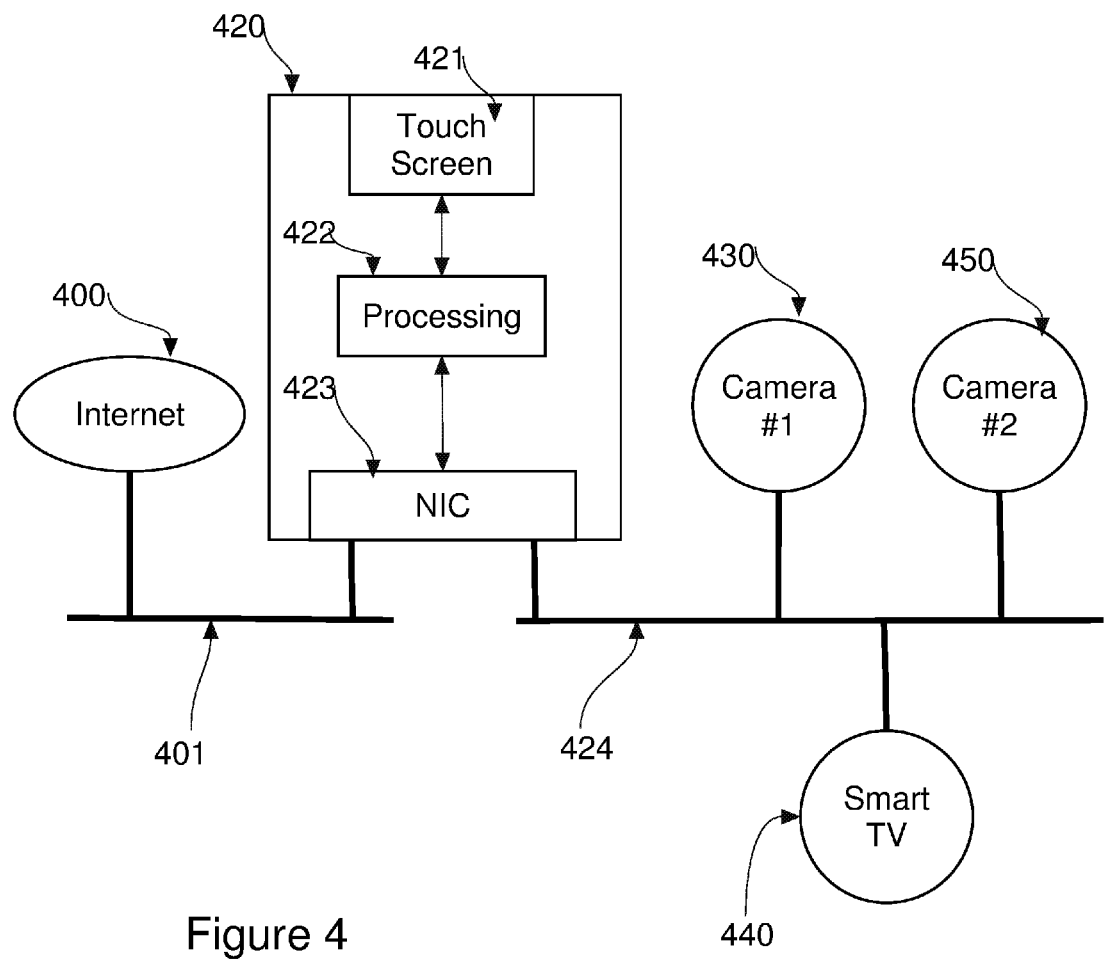
FIG. 4 is a schematic diagram of a TTC Device implemented as a stand-alone machine.

FIG. 4 shows a schematic diagram of the system and method implemented as a standalone device 420. The device 420 separates the Internet 400 from the Internet-based cameras 430 and 450 and the smart television 440. These IoT devices 430, 440, 450 communicate 424 with the TTC Device. The communication data packets are processed 422 in accordance with embodiments similar to those illustrated in FIGS. 1-2, and the display 421 is processed in accordance with embodiments similar to those shown in FIG. 3. As a touch-screen implementation, a pressing of the display can be considered a "user click" similar to clicking with a mouse to make a selection.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for securing a network-connected device from a hacker having access to a network to which the network-connected device is communicatively connected, the system comprising:
   at least one network-connected device ("IoT Device") communicatively connected to a communications network;
   a transparent traffic control device ("TTC Device") for intercepting a data packet transmitted via the communications network to and from the at least one IoT Device and at least one remote destination, wherein the TTC Device comprises:
      an IoT device identification process for detecting each at least one IoT Device that connects to the communications network and for assigning each newly detected at least IoT device to a group selected from among at least one group, wherein each at least one group comprises a group identity;
      a status selection process for assigning the status of each at least one group, wherein the status is allowed or blocked;
      a group data structure comprising an identity of each at least one IoT Device detected by the IoT device identification process and the group identity of the at least one group to which each at least one IoT Device is assigned; and
      a firewall that allows or blocks transmission of the data packet based on the status of the group that the IoT Device, to or from which the data packet is transmitted, is assigned; and
   a control interface for displaying the group name and the status of the group identity.

2. The system of claim 1, wherein a packet received by the firewall from a remote destination comprising an allowed status is permitted by the firewall to be transmitted to the IoT device, and wherein a packet received by the firewall from a remote destination comprising a blocked status is discarded.

3. The system of claim 1, wherein the IoT Device comprises a television, a printer, a home security camera, a motion detector, a home alarm system, a thermostat, a light bulb, an automobile, a gaming console, a handheld gaming device, a DVD player, a radio, a stereo, a portable music playing device, a speaker, an appliance, a computer, a tablet computer, or a smart phone.

4. The system of claim 1, wherein the TTC Device comprises a computing device, a router, or a separate and unitary standalone device.

5. The system of claim 4, wherein the control interface is part of or is directly connected to the TTC device.

6. The system of claim 4, wherein the control interface is part of or is directly connected to a computing device that is not the TTC device.

7. The system of claim 1, wherein the IoT Device comprises the TTC Device as an integral component of the IoT Device.

8. The system of claim 1, wherein the status for the at least one group is changeable using the status selection process.

9. The system of claim 1, wherein the group is identified on the interface by the group name, a color, a symbol, or a combination of one or more of the foregoing.

10. The system of claim 1, wherein the at least one remote destination comprises a domain name, a subdomain, an IP address, or other remote destination.

11. The system of claim 1, wherein the TTC Device further comprises a pairing process for identifying and assigning a status to a remote destination/IoT Device pair, wherein the remote destination/IoT Device pair is identified when the IoT device attempts to communicate with the at least one remote destination or when the at least one remote destination attempts to communicate with the IoT Device, and wherein the status of the remote destination/IoT Device pair is allowed or blocked.

12. A method for securing a network-connected device from a hacker having access to a network to which the network-connected device is communicatively connected, the method comprising the steps of:
(a) installing a transparent traffic control device ("TTC Device") between at least one network-connected device ("IoT Device") and communications network to which the IoT Device is communicatively connected;
(b) using the TTC device, intercepting a data packet transmitted to or from the IoT Device;
(c) using an IoT device identification process operable on the TTC Device, detecting each new at least one IoT Device that connects to the communications network;
(d) displaying an identity of the IoT Device on a control interface;
(e) assigning each newly detected at least one IoT device to a group selected from among at least one group, wherein each at least one group comprises a group identity;
(f) assigning the status of each at least one group, wherein the status is allowed or blocked;
(g) storing the identity of each at least one IoT Device detected by the IoT device identification process and the group identity of the at least one group to which each at least one IoT Device is assigned in a group data structure; and
(h) using a firewall, allowing or blocking transmission of the data packet based on the status of the group that the IoT Device, to or from which the data packet is transmitted, is assigned.

13. The method of claim 12, further comprising the step of:
(i) using a pairing process operable on the TTC Device, identifying and assigning a status to a remote destination/IoT Device pair, wherein the remote destination/IoT Device pair is identified when the IoT device attempts to communicate with the at least one remote destination or when the at least one remote destination attempts to communicate with the IoT Device, and wherein the status of the remote destination/IoT Device pair is allowed or blocked.

14. The method of claim 12, further comprising a step selected from the group consisting of:
(j) allowing all data packets to or from each newly detected at least one IoT Device until the status is changed to blocked; and
(k) blocking all data packets to or from each newly detected at least one IoT Device until the status is changed to allowed.

* * * * *